(12) United States Patent
Bönsel et al.

(10) Patent No.: US 6,462,095 B1
(45) Date of Patent: Oct. 8, 2002

(54) POLYMER-STABILIZED METAL COLLOID SOLUTIONS, METHOD FOR PRODUCING SAID SOLUTIONS AND USE OF THE SAME AS CATALYSTS FOR FUEL CELL

(75) Inventors: Harald Bönsel, Whitehouse Station, NJ (US); Gregor Deckers, Frankfurt (DE); Georg Frank, Tübingen (DE); Hans Millauer, München (DE); Thomas Soczka-Guth, Hofheim (DE)

(73) Assignee: Axiva GmbH (DE)

( * ) Notice: Subject to any disclaimer, the term of this patent is extended or adjusted under 35 U.S.C. 154(b) by 0 days.

(21) Appl. No.: 09/529,528

(22) PCT Filed: Oct. 9, 1998

(86) PCT No.: PCT/EP98/06413

§ 371 (c)(1),
(2), (4) Date: Aug. 31, 2000

(87) PCT Pub. No.: WO99/21239

PCT Pub. Date: Apr. 29, 1999

(30) Foreign Application Priority Data

Oct. 17, 1997 (DE) .......................................... 197 45 904

(51) Int. Cl.⁷ ............................ B01F 17/12; B01J 23/42; B01J 35/02; H01M 4/92
(52) U.S. Cl. ........................ 516/97; 75/721; 106/1.21; 429/42; 502/173; 502/339
(58) Field of Search ........................... 516/97; 106/1.21; 429/42, 46; 502/173, 339; 75/721

(56) References Cited

U.S. PATENT DOCUMENTS

| | | | | |
|---|---|---|---|---|
| 3,311,468 A | * | 3/1967 | Davidoff ........................ | 75/721 |
| 4,166,143 A | * | 8/1979 | Petrow et al. ............. | 429/42 X |
| 4,425,261 A | * | 1/1984 | Stenius et al. .......... | 106/1.21 X |
| RE33,149 E | * | 1/1990 | Petrow et al. ............. | 429/42 X |
| 5,275,999 A | * | 1/1994 | Tsurumi et al. .............. | 502/339 |
| 5,294,232 A | * | 3/1994 | Sakairi et al. ............. | 429/42 X |
| 5,861,222 A | * | 1/1999 | Fischer et al. .......... | 106/1.21 X |
| 6,074,979 A | * | 6/2000 | Hagemeyer et al. .... | 502/339 X |
| 6,090,858 A | * | 7/2000 | El-Sayed ..................... | 516/97 |

OTHER PUBLICATIONS

Chemical Abstracts, vol. 107, No. 12, Sep. 21, 1987, Columbus, Ohio, US; Abstract No. 104995x₂ Fujita Et Al.: "Manufacture of Ion Exchange Membrane–Electrode Connection" XP 002095061.*

* cited by examiner

Primary Examiner—Richard D. Lovering
(74) Attorney, Agent, or Firm—Connolly Bove Lodge & Hutz LLP

(57) ABSTRACT

Polymer-stabilized metal colloid solutions, process for preparing them and their use as catalysts for fuel cells. Process for preparing metal colloid solutions by reacting a platinum compound and, if desired, one or more compounds of Rh, Ru, Ir or Pd with a reducing agent. At least one cation-exchange polymer is used for stabilizing the metal colloid solution.

16 Claims, No Drawings

POLYMER-STABILIZED METAL COLLOID SOLUTIONS, METHOD FOR PRODUCING SAID SOLUTIONS AND USE OF THE SAME AS CATALYSTS FOR FUEL CELL

This application is a filing under 35 USC §371 of PCT/EP98/06413, filed Oct. 9, 1998.

Polymer-stabilized metal colloid solutions, process for preparing them and their use as catalysts for fuel cells.

The invention relates to metal colloid solutions which comprise one or more platinum compounds and, if desired, one or more compounds of Rh, Ru, Ir or Pd and are stabilized by polymeric protective colloids, and also a process for preparing them and their use as catalysts, in particular in fuel cells.

The use of a sol process for producing heterogeneous catalysts whose active centers consist of a metal, in particular a noble metal, for chemical and electrochemical processes is known. Here, a sol of the respective catalytically active metal or, if desired, two or more metals is first prepared in a separate process step and the dissolved or solubilized nanosize particles are subsequently immobilized on the support. General descriptions of this method may be found, for example, in (a) B. C. Gates, L. Guczi, H. Knözinger, Metal Clusters in Catalysis, Elsevier, Amsterdam, 1986; (b) J. S. Bradley in Clusters and Colloids, VCH, Weinheim 1994, pp. 459–544 or (c) B.C. Gates, Chem. Rev. 1995, 95, 511–522.

In general, the sols are prepared using a stabilizer, in particular when further-processable sols having a metal concentration of 0.1% or above are required. The stabilizer envelops the metal particle and prevents the agglomeration of the particles by means of electrostatic or steric repulsion. In addition, the stabilizer has some influence on the solubility of the particles.

Possible stabilizers include both low molecular weight compounds and polymeric compounds.

EP-A-0 672 765 describes the electrochemical preparation of platinum hydrosols using cationic and betaine-type stabilizers and also describes catalysts produced therefrom, which are said to be suitable, inter alia, for fuel cells.

Coated catalysts comprising platinum, which are prepared via a cationically stabilized hydrosol and are suitable for fuel cells, are described in, for example, DE-A44 43 701. In these, the particles of a noble metal form a shell which extends up to 200 nanometers into the support particle.

Platinum sols containing polymeric stabilizers such as polyacrylic acid, polyvinyl alcohol or poly(N-vinylpyrrolidone) and their use for producing catalysts, including ones for fuel cells, have likewise been described (J. Kiwi and M. Gratzel, J. Am. Chem. Soc. 101 (1979) 7214; N. Toshima et al., Chemistry Letters 1981 793). Apart from stabilizing the sol in question, the polymers mentioned have no functional importance.

To obtain a low internal resistance in a membrane fuel cell, it is of critical importance that the transport of protons and electrons within the cell can proceed with as little hindrance as possible. Every barrier between the catalytically active platinum centers and the conduction paths of the electrons and/or protons inhibits the process or brings it to a stop. Critical zones are the sections between the catalytically active centers and the current collectors or the membrane, since a plurality of phase transitions take place in these regions.

A difficult task is to bring about proton charge transport by contact between the catalytically active platinum centers and the membrane. In the methods known from the prior art, the platinum/carbon mixture is, for example, worked into the surface of the membrane by rolling or pressing. However, this way of establishing the contact is difficult to control and there is a risk of excessive hindrance to mass transfer from and to the platinum centers. Furthermore, there is a risk of some of the platinum particles losing contact to the current collector.

In another process, a certain amount of polymeric cation-exchange material is introduced into the platinum/carbon layer, for example by impregnating the platinum/carbon mixture with a solution of the polymeric cation-exchange material, before the platinum/carbon mixture is pressed onto the membrane. This process has the disadvantage that it can result in a reduction in the surface area of the catalyst or the carbon particles can be enveloped too much so that they become electrically insulated.

As a result of this unsatisfactory contact with the current collector or with the membrane, more platinum than would actually be necessary for achieving a particular electric output is needed. In practice, the amount of platinum used is from about 0.5 to 4 mg/cm$^2$ of membrane area. This corresponds to a number of 100 g platinum for a practical vehicle having a motor power of 40–50 kW.

A further, significant reason for the increased platinum requirement is the production process predominantly employed in the past for the platinum/carbon mixture. In this process, the solution of a reducible or precipitatable platinum compound is applied to the carbon support by impregnation or spraying. Subsequently, the platinum compound is converted into finely divided platinum or platinum oxide particles by precipitation and/or chemical reduction, frequently resulting in formation of relatively large particles having a diameter of up to a few 10 s to 100 nanometers. This causes a reduction in the catalytic activity as a result of the decrease in the specific surface area of the platinum. This can be illustrated by the following example: a cluster, which in the interests of simplicity can be thought of as a queue, made of up atoms of a metal having a given diameter of 0.25 nanometers contains approximately 87% surface atoms at an edge length of 1 nanometer, 49% surface atoms at an edge length of 2.5 nanometers and 0.14% surface atoms at an edge length of 10 nanometers.

It is also known that a platinum catalyst on a carbon support loses surface area under customary operation conditions, i.e. at elevated temperature. This loss is due to the fact that the platinum particles migrate on the support surface and can combine with other particles, i.e. recrystallize to form larger particles. This effect is more pronounced, the smaller the platinum particles. From this point of view it is desirable to reduce the migration velocity of the platinum particles by embedding them in a polar microenvironment which interacts strongly with the carbon support.

In summary, it may be said that in order to obtain a functional membrane fuel cell it is necessary, firstly, to achieve a high dispersion of the catalytically active metal centers, secondly to ensure unhindered transport of starting materials, products and also protons and electrons and thirdly to reduce the recrystallization of the metal particles to form larger particles on the carbon support.

It is an object of the present invention to provide water-soluble, stabilized metal colloids comprising ultrafine particles of platinum. or platinum metals and also a process for preparing them. These colloids should be suitable as catalysts, in particular for fuel cells. When using such metal colloids as catalysts for membrane-electrode units (MEAs), the platinum particles should be in good proton-conducting contact with the membrane and exhibit a reduced tendency to recrystallize.

The present invention achieves this object and thus provides water-soluble metal colloids comprising one or more platinum compounds and, if desired, one or more compounds of Rh, Ru, Ir or Pd, where the metal colloids are stabilized by a proton-conducting protective colloid. According to the invention, the protective colloids used are water-soluble or solubilizable cation-exchange polymers.

Furthermore, the present invention provides a process for preparing these metal colloid solutions by reacting a platinum compound and, if desired, one or more compounds of Rh, Ru, Ir or Pd with a reducing agent. To stabilize the metal colloid solutions, use is made of at least one cation-exchange polymer, and the reduction is either carried out in the presence of the cation-exchange polymer or the cation-exchanger polymer is added to the solution after the reduction step. The stabilized metal colloid (sol) can subsequently be purified by reprecipitation and/or be concentrated by evaporation.

When the metal colloids of the invention are used as catalysts, the ultrafine particles comprising a proton-conductive polymer and enveloped in a microstructure are uniformly distributed and immobilized on the surface or in the surface region of a carbon support so that the platinum particles can, in the subsequent construction of the MEA, be brought into improved proton-conducting contact with the membrane and exhibit a reduced tendency to recrystallize.

To prepare the metal colloid solutions of the invention, the metal compounds of platinum, rhodium, ruthenium, palladium and iridium to be used are employed as starting materials in the form of soluble compounds, in particular water-soluble salts. Examples are hexachloroplatinic(IV) acid hydrate, hydroxydisulfitoplatinic acid, platinum nitrate, hexachloroiridic(IV) acid hydrate, palladium(II) acetate, iridium(III) acetylacetonate, ruthenium(III) acetylacetonate, ruthenium(III) nitrate, rhodium(III) chloride hydrate, to name only a few. The metal compounds are used in concentrations of from about 0.1 to 100 g per liter, preferably from 1 to 50 g per liter, based on the solvent.

In a preferred embodiment, the ratio of Pt to other platinum metals is 99–60% by weight of platinum to 1–40% by weight of Rh, Ru, Ir and/or Pd.

The cation-exchange polymers used for preparing the metal colloid solutions possess strongly acidic, easily dissociable groups, for example carboxylic acid groups, sulfonic acid groups or phosphonic acid groups. A characteristic of the polymers used is thus the ability of cations and particularly protons to move readily in the polymer matrix, particularly in the swollen state.

The cation-exchange polymers which can be used according to the invention may be selected from various classes of chemical substances, for example sulfonated polyaryl ether ketones, sulfonated polyether sulfones, sulfonated polyphenylene sulfides, sulfonated acrylonitrile-butadiene-styrene copolymers (ABS), poly(styrenesulfonic) acids, poly($\alpha,\beta,\gamma$-trifluorostyrenesulfonic acids) and poly[perfluoroethylene-co-2-(1-methyl-2-vinyloxyethoxy)ethanesulfonic acid] and perfluorinated cation-exchange resins and other high-performance polymers having a similar structure.

The polymers belonging to the group of sulfonated polyaryl ether ketones are made up of phenylene radicals which are linked via ether or ketone groups and preferably bear sulpho groups in the ether subunits. Examples of such polymers are the sulfonated polyether ketones (PEK) (1), sulfonated polyether ether ketones (PEEK) (2), sulfonated polyether ketoneketones (PEKK) (3), sulfonated polyether ether ketone ketones (PEEKK) (4) and sulfonated polyether ketone ether ketone ketones (PEKEKK) (5) shown in the following formulae:

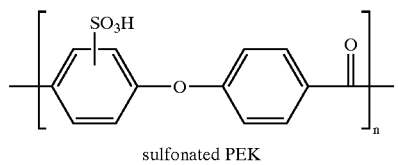

sulfonated PEK

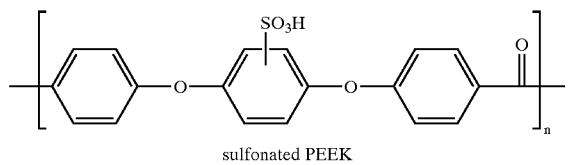

sulfonated PEEK

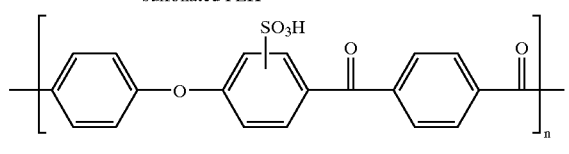

sulfonated PEKK

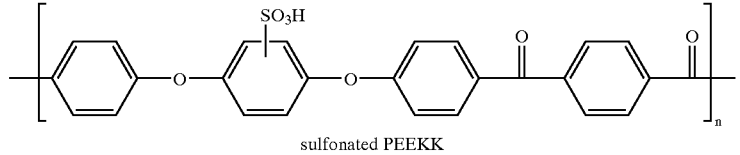

sulfonated PEEKK

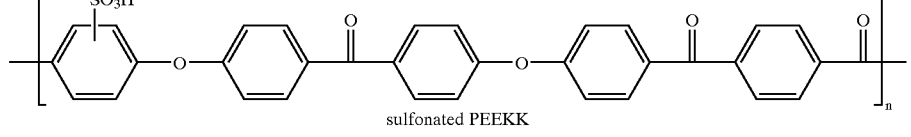

sulfonated PEEKK

The unsulfonated parent polymers are known, for example, under the trade names Hostatec®, Victrex® or Ultrapek®.

The polymers belonging to the group of sulfonated polyaryl ether sulfones are made up of phenylene radicals which are linked via ether or sulfone groups and bear sulfonic acid groups in the ether subunits, for example the sulfonated polyether sulfone (PES) (6):

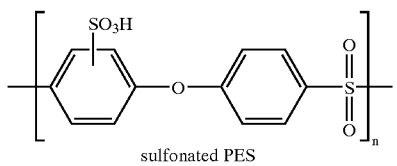

sulfonated PES

Such polymers are obtained using unsulfonated base polymers as are known, for example, under the tradenames polyether sulfone Victrex 200 P®, polyether sulfone Victrex 720 P®. Polyaryl sulfone Radel®, polyether sulfone Astrel®, polysulfone or Udel® as starting materials.

The sulfonic acid groups can be introduced by methods known per se by reacting the base polymers with sulfuric acid, oleum or chlorosulfonic acid as described in JP-A-043 107 732.

The degree of sulfonation indicates the percentage of monomer units which bear a sulfonic acid group. Polyether ketones or polyether sulfones which are suitable for the process of the invention preferably have a degree of sulfonation in the range from 20 to 95%, in particular in the range from 40 to 85%.

Perfluorinated cation-exchange resins which can be used according to the invention are, for example, copolymers of tetrafluoroethylene and perfluorinated vinyl ethers having a terminal sulfonic acid group, phosphonic acid group or carboxylic acid group. Formula (7) shows a typical structure of perfluorinated cation-exchange resins, without implying that the fluoro-polymers which can be used according to the invention are restricted to this formula:

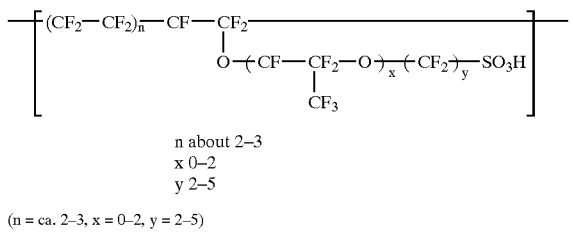

n about 2–3
x 0–2
y 2–5

(n = ca. 2–3, x = 0–2, y = 2–5)

Examples of commercially available perfluorinated cation-exchange resins are poly[perfluoroethylene-co-2-(1-methyl-2-vinyloxyethoxy)ethanesulfonic acid] (x=1, y=2) and compounds having similar structures. The products are obtainable under the tradenames Aciplex-S® (Asahi Chemical) or Nafion® (E.I. DuPont de Nemours) or as experimental membrane (Dow Chemical).

To prepare the metal colloid solutions, soluble or solubilizable cation-exchange polymers can be used as protective colloids. The solubility of the polymers in water or lower aliphatic alcohols, for example methanol or ethanol, can be controlled via the degree of polymerization and via the number of acid groups. Aqueous alcoholic solutions or sols of Nafion are commercially available. If desired, colloidal solutions can also be prepared from commercial, perfluorinated cation-exchange membranes by heating for a number of hours in N-methylpyrrolidone; these can subsequently be diluted with water.

Solutions of sulfonated polyether ketones can be prepared by dissolving them in, for example, N-methylpyrrolidone, dimethyl sulfoxide, dimethyl-formamide or dimethylacetamide, and these solutions can subsequently be diluted with water or lower aliphatic alcohols.

Cation-exchange polymers which are suitable according to the invention have an ion-exchange capacity in the range from 0.5 to 5 meq/g, in particular in the range from 0.8 to 3.5 meq/g. Preference is generally given to polymers which have relatively high ion-exchange capacities and tend to dissolve readily in water and/or polar solvents and have a high swelling capability.

The cation-exchange polymers are used in amounts of from 5 to 400% by weight, preferably from 10 to 2,000% by weight, based on the metal present (Pt, Ir, Rh, Ru and Pd).

The reduction can be carried out in water or in a mixture of water and one or more water-miscible organic solvents or in the absence of water in an organic solvent.

Examples of suitable solvents are methanol, ethanol, ethylene glycol, tetrahydrofuran, dimethoxyethane, acetone, N-methylpyrrolidone, dimethyl-formamide and dimethylacetamide. The metal colloid solutions are preferably prepared in water (hydrosols) or in water with addition of from 1 to 50% by weight, preferably from 5 to 25% by weight, of an organic solvent.

Suitable reducing agents are all customary reducing agents which have a sufficiently negative reduction potential, for example hydrogen, sodium borohydride, monohydric or dihydric alcohols such as ethanol or ethylene glycol, or hydroxymethanesulfinic acid sodium salt. The preferred reducing agent is hydroxymethanesulfinic acid sodium salt (Rongalit®).

The reducing agent is generally used in a stoichiometric amount based on the metal compound(s), but preferably in excess. The excess can be, for example, from 10 to 100 mol %.

The sols are preferably prepared at temperatures in the range from 0 to 200° C., in particular from 20 to 100° C. The components can generally be added in any order, and it is useful to stir the mixture so as to aid mixing. In the preferred procedure, the reducing agent. is added last. If-the cation-exchange polymer is added only after the reduction, it has to be added before agglomeration commences.

The soluble metal colloids of the invention are soluble in water or an organic solvent, with "soluble" also being used in the sense of "solubilizable" i.e. forming sols. The solubility is at least 50 g/l and is usually in the range from 50 to 200 g/l, in particular in the range from 70 to 150 g/l.

The metal colloids stabilized by cation-exchange polymers are novel compounds of relatively uniform composition. On the basis of studies by transmission electron microscopy (TEM), the particles obtained have a very narrow size distribution. Typically 90% of the particles deviate by less than 20% from the mean diameter. The diameter of the metal core depends to some extent on the type and amount of the stabilizer used. It is generally less than 3 nanometers, mostly less than 2 nanometers. In many cases, the diameter of the metal core is about 1 nanometer or less.

The total diameter $R_h$ of the particles including the protective colloid shell has been found to be in the range from about 2 to 4 nanometers by means of dynamic light scattering.

The platinum-cation-exchange polymer complexes after reprecipitation and isolation as solid contain about 55–65% by weight of metal(s) (Pt, Pd, Ir, Rh, Ru).

The metal colloids of the invention are suitable as catalysts, in particular for fuel cells. For this purpose, for example, a finely divided support, e.g. of carbon, carbon black or graphite, is brought into contact with the metal colloid solution of the invention and the catalyst is separated from the liquid phase in a manner known per se by filtration or centrifugation.

To produce the platinum/carbon black mixture, metal concentrations of at least 10 g/liter are generally desirable.

The metal colloid solutions (sols) obtained according to the invention can, if desired, be concentrated by gently distilling off water and/or the solvent. If necessary, the sols obtained according to the invention can be purified by reprecipitation in a manner known per se and can, if desired, be concentrated at the same time. Precipitation of a colloidally dissolved platinum-cation-exchange polymer complex can be carried out by addition of acetone or isopropanol. The platinum-cation-exchange polymer gels obtained can be redissolved in water, giving metal concentrations of at least 50 g/liter.

To produce catalysts, the aqueous metal colloid solutions prepared as described above are brought into contact with a fine powder of conductive support material and the liquid phase is subsequently separated off. This results in immobilization of the platinum particles surrounded by an inherent, proton-conducting envelope on the support particle. It has been found that the platinum-cation-exchange polymer complexes of the invention are preferentially deposited on the surface or in surface-near regions of the support and have good adhesion to the support.

This makes if possible to improve the transport of protons between the catalytic centers in the electrode layer of the anode or cathode, respectively, and the membrane.

The support comprises, in particular, finely divided carbon, carbon black or graphite. Preference is given to using. specific, electrically conductive carbons (carbon black) which are commercially available, for example ®Vulcan XC 72R.

The carbon supports used can, before or after being loaded with the nanosize platinum particles of the invention, be additionally treated with materials such as proton-conducting polymers (U.S. Pat. No. 4,876,115).

The carbon support can be loaded, for example, by introducing the metal colloid solution with mixing into a suspension of the support in water or a water/alcohol mixture, stirring the suspension for a further period and isolating the platinum/carbon mixture by filtration or centrifugation.

The metal colloid solutions produced according to the invention are very stable and contain particles having a diameter of typically 1 nanometer or less. This achieves an extraordinarily high dispersion of the expensive noble metals.

The microenvironment of a rigid, polar cation-exchange polymer additionally effects good stabilization of the catalytic centers on the support and inhibits recrystallization of the particles on the support.

The cation-exchange polymers, in particular the perfluorinated cation-exchange resins, utilized for enveloping the catalytically active centers have a good solvent capacity for the gaseous fuels or oxygen. As a result, transport of the reactants to the centers is not hindered.

The cation-exchange polymers generally have a high swelling capability which can be adjusted via the molecular weight and the ion-exchange capacity. When using the metal colloid solutions of the invention as catalysts, it is thus possible to improve the water balance of the electrodes, which differs between anode and cathode, by adapting the swelling capability of the cation-exchange polymers used.

EXAMPLE 1

570 ml of deionized water, 30 g of a 5% strength solution of sulfonated Hostatec® (polyether ketone (PEEKK), molecular weight $M_n$: about 40,000, manufacturer: Hoechst AG, Frankfurt am Main; degree of sulfonation: 65%) in N-methylpyrrolidone and 2.50 g (about 5 mmol) of hexachloroplatinic(IV) acid hydrate (platinum content: about 40%) were placed in a 2 l conical flask. 5% strength ammonia solution was added dropwise until a pH of 7.0 had been reached. While stirring vigorously at 90–95° C., a solution of 2.50 g (21 mmol) of hydroxymethanesulfinic acid sodium salt (Rongalit) in 20 ml of deionized water was then added. The solution briefly became lighter in color and then became dark reddish brown. It was allowed to stand for 15 hours at room temperature, after which the hydrosol obtained was filtered through a G4 glass frit, the filtrate was admixed with 750 ml of acetone, stirred for 5 minutes and the precipitate which formed was allowed to settle for 3 hours. After decanting off most of the supernatant liquid, the remainder was centrifuged for 15 minutes at 7,000 rpm. The supernatant liquids from the decantation and centrifugation were admixed with 500 ml of acetone and centrifuged. The two centrifugation residues were combined and dissolved in 30 ml of deionized water, precipitated by addition of 90 ml of acetone and centrifuged again. The moist residue obtained was dis-solved in water to give 20 g.

TEM analysis of the particles (transmission electron microscope: Philips CM 30; a sample of the sol was applied to a carbon-coated copper gauze) gave a particle size of 1 nanometer. 5.0 g of the hydrosol obtained were evaporated and dried over concentrated sulfuric acid in a vacuum desiccator. Analysis of the solid obtained gave 63% of platinum (ICP-OES) and 10.6% of sulfur (combustion analysis/IR detection). The dried gel redissolved in water.

EXAMPLE 2

500 ml of deionized water, 50 g of a 2% strength solution of sulfonated Hostatec® (polyether ether ketone ketone (PEEKK), molecular weight $M_n$: 40,000, manufacturer: Hoechst AG, Frankfurt am Main; degree of sulfonation: 74.2%) in N-methylpyrrolidone and 2.50 g (about 5 mmol) of hexachloroplatinic(IV) acid hydrate (platinum content: about 40%) were placed in a 2 I conical flask. 5% strength ammonia solution was added dropwise until a pH of 7.0 had been reached. While stirring vigorously at 90–95° C., a solution of 2.50 g (21 mmol) of hydroxymethanesulfinic acid sodium salt (Rongalit) in 20 ml of deionized water was then added. The solution briefly became lighter in color and then became dark reddish brown. It was allowed to cool to room temperature and left to stand for 20 hours, and the sol was then admixed with 600 ml of acetone, stirred for 5 minutes and the precipitate which formed was allowed to settle for 4 hours. After decanting off most of the supernatant liquid, the remainder was centrifuged for 15 minutes at 7,000 rpm. The centrifugation residue was dissolved in 50 ml of deionized water, precipitated by addition of 100 ml of acetone and centrifuged again. The moist residue obtained was dissolved in 40 ml of water and, after addition of 10 g of N-methylpyrrolidone, concentrated to 20 g.

TEM analysis of the particles (transmission electron microscope: Philips CM 30; a sample of the sol was applied to a carbon-coated copper gauze) gave a particle size of less than 1 nanometer. A sample of the sol obtained was precipitated by means of acetone, centrifuged and dried over concentrated sulfuric acid in a vacuum desiccator. Analysis of the solid obtained gave 63% of platinum (ICP-OES) and 11.5% of sulfur (combustion analysis/IR detection). The dried gel redissolved in water.

EXAMPLE 3

500 ml of deionized water and 170 g of N-methylpyrrolidone were placed in a 2 I conical flask. 50 g of a 2% strength solution of sulfonated Victrex® (polyether ether ketone (PEEK), molecular weight $M_n$: about 80,000, manufacturer: ICI; degree of sulfonation: 50.7%) in N-methylpyrrolidone and 2.50 g (about 5 mmol) of hexachloroplatinic(IV) acid hydrate (platinum content: about 40%) were added, followed by dropwise addition of 5% strength ammonia solution until a pH of 7.0 had been reached. While stirring vigorously at 90–95° C., a solution of 2.50 g (21 mmol) of hydroxymethanesulfinic acid sodium salt (Rongalit ) in 20 ml of deionized water was then added. The solution briefly became lighter in color and then became dark reddish brown. It was allowed to cool to room temperature and left to stand for 20 hours, and the sol was then admixed with 600 ml of acetone, stirred for 5 minutes and the precipitate which formed was allowed to settle for 4 hours. After decanting off most of the supernatant liquid, the remainder was centrifuged for 15 minutes at 7000 rpm. The centrifugation residue was dissolved in 50 ml of deionized water, precipitated by addition of 100 ml of acetone and centrifuged again. The moist residue obtained was dissolved in 40 ml of water and, after addition of 10 g of N-methylpyrrolidone, concentrated to 20 g.

TEM analysis of the particles (transmission electron microscope: Philips CM 30; a sample of the sol was applied to a carbon-coated copper gauze) gave a particle size of less than 1 nanometer. A sample of the sol obtained was precipitated by means of acetone, centrifuged and dried thoroughly over concentrated sulfuric acid in a vacuum desiccator. Analysis of the solid obtained gave 63% of platinum (ICP-OES) and 10.9% of sulfur (combustion analysis/IR detection). The dried gel redissolved in water.

EXAMPLE 4

500 ml of deionized water were placed in a 2 l conical flask. 50 g of a 2% strength solution of Nafion® 117 in N-methylpyrrolidone (Nafion® 117 is a commercially available perfluorinated cation-exchange membrane from E.I. DuPont de Nemours. 1.94 g of Nafion® 117 pieces were heated at 190–195° C. in 100 g of N-methylpyrrolidone for 16 hours while stirring and the resulting solution was evaporated to dryness under reduced pressure. The residue (1.0 g) was dissolved in 50 g of N-methylpyrrolidone) and 1.00 g (about 2 mmol) of hexachloroplatinic(IV) acid hydrate (platinum content: about 40%) were added, followed by dropwise addition of 5% strength ammonia solution until a pH of 7 had been reached. While stirring vigorously at 90–95° C., a solution of 1.00 g (8.5 mmol) of hydroxymethanesulfinic acid sodium salt (Rongalit ) in 20 ml of deionized water was then added. The solution briefly became lighter in color and then became dark reddish brown. It was allowed to cool to room temperature and left to stand for 20 hours, and the hydrosol was then admixed with 600 ml of acetone, stirred for 5 minutes and the precipitate which formed was allowed to settle for 3 hours. After decanting off most of the supernatant liquid, the remainder was centrifuged for 15 minutes at 7000 rpm. The centrifugation residue was dried over concentrated sulfuric acid in a vacuum desiccator.

Analysis of the solid obtained gave 66% of platinum (ICP-OES) and 10.2% of sulfur (combustion analysis/IR detection). The dried gel remained water-soluble for some days.

EXAMPLE 5

500 ml of deionized water were placed in a 2 l conical flask. 1.00 g (about 2 mmol) of hexachloroplatinic(IV) acid hydrate (platinum content: about 40%) was added, followed by dropwise addition of 5% strength ammonia solution until a pH of 7 had been reached. While stirring vigorously at 90–95° C., 2.0 g of a 5% strength solution of Nafion perfluorinated ion-exchange powder in a mixture of water and lower aliphatic alcohols (procured from Aldrich-Chemie GmbH & Co KG, D-89552 Steinheim) and subsequently a solution of 1.00 g (8.5 mmol) of hydroxymethanesulfinic acid sodium salt (Rongalit®) in 20 ml of deionized water were added. The solution briefly became lighter in color and then became dark reddish brown. It was allowed to cool to room temperature and left to stand for 6 hours, and the hydrosol was then admixed with 1000 ml of acetone, stirred for 5 minutes and the precipitate formed was allowed to settle for 15 hours. After decanting off most of the supernatant liquid, the remainder was centrifuged for 15 minutes at 7000 rpm. The centrifugation residue was all dissolved in water to give 10.0 g of reddish brown sol. TEM analysis of the particles (transmission electron microscope: Philips CM 30; a sample of the sol was applied to a carbon-coated copper gauze) gave a particle size of less than 1 nanometer.

EXAMPLE 6

500 ml of deionized water were placed in a 1l conical flask. 2.00 g (about 4 mmol) of hexachloroplatinic(IV) acid hydrate (platinum content: about 40%), 0.40 g (about 0.8 mmol) of hexachloroiridic(IV) acid hydrate) and 10 g of a 5% strength solution of sulfonated Victrex® (polyether ether ketone (PEEK), molecular weight $M_n$: about 80,000, manufacturer: ICI; degree of sulfonation: 50.7%) in N-methylpyrrolidone were added. The solution was admixed with 5% strength ammonia solution until a pH of 7 had been reached. While stirring vigorously at 95–98° C., a solution of 1.77 g (about 15 mmol) of hydroxymethanesulfinic acid sodium salt (Rongalit®) in 20 ml of deionized water was added. The solution briefly became lighter in color and then became dark brown. It was allowed to cool to room temperature and left to stand for 20 hours, and the hydrosol formed was admixed with 3500 ml of acetone in a 4 l glass beaker, stirred for 5 minutes and the precipitate formed was allowed to settle for 20 hours. After decanting off most of the supernatant liquid, the remainder was centrifuged for 15 minutes at 7000 rpm. The centrifugation residue was dissolved in 100 ml of water and reprecipitated by addition of 150 ml of acetone and centrifuged. The residue was dissolved in water to give 20.0 g.

EXAMPLE 7

500 ml of deionized water were placed in a 1 l conical flask. 2.00 g (about 4 mmol) of hexachloroplatinic(IV) acid hydrate (platinum content: about 40%), 0.30 g (about 1 mmol) of ruthenium(III) chloride hydrate and 10 g of a 5% strength solution of sulfonated Victrex® (polyether ether ketone (PEEK), molecular weight $M_n$: about 80,000, manufacturer: ICI; degree of sulfonation: 50.7%) in N-methylpyrrolidone were added. The solution was admixed with 5% strength ammonia solution until a pH of 7 had been reached. While stirring vigorously at 95–98° C., a solution of 1.77 g (about 15 mmol) of hydroxymethanesulfinic acid sodium salt (Rongalit®) in 20 ml of deionized water was added. The solution briefly became lighter in color and then became dark brown. It was allowed to cool to room temperature and left to stand for 20 hours, and the hydrosol formed was admixed with 3000 ml of acetone in a 4 l glass beaker, stirred for 5 minutes and the precipitate formed was allowed to settle for 5 hours. After decanting off most of the supernatant liquid, the remainder was centrifuged for 15 minutes at 7000 rpm. The centrifugation residue was dissolved in 100 ml of water and reprecipitated by addition of 150 ml of acetone and centrifuged. The residue was dissolved in water to give 20.0 g.

EXAMPLE 8

2.00 g of Vulcan XC 72R (Manufacturer: Cabot B. V., Rozenburg, The Netherlands), 25 ml of water and 5 ml of methanol were placed in a 100 ml round-bottomed flask which contained 5 porcelain spheres (diameter: 10 mm), and were mixed by rotation on a rotary evaporator at 100 rpm for 4 hours. While continuing the rotation, 5.0 g of platinum sol prepared as described in Example 1 using a sulfonated PEEKK protective colloid and diluted with 5 ml of water was pumped at 20–25° C. over a period of 0.5 hours into the uniform suspension obtained. The suspension was subsequently rotated for another 3 hours. The coated carbon was filtered off with suction (blue band filter, Schleicher & Schüll) and dried over concentrated sulfuric acid in a vacuum desiccator. The weight obtained was 2.24 g. Analysis of the catalyst obtained gave 66% of platinum (ICP-OES). TEM analysis (transmission electron microscope: Philips CM 30; the particles were applied to a carbon-coated copper gauze) of the catalyst particles indicated a uniform distribution of the platinum particles which had a diameter of about 1 nanometer.

EXAMPLE 9

The procedure was as in Example 8. 2.00 g of Vulcan XC 72R were suspended in 20 ml of water and 5 ml of methanol. While continuing the rotation, 6.7 g of Nafion-stabilized platinum sol prepared as described in Example 5 using a perfluorinated cation-exchange resin as protective colloid were pumped into this suspension at 20–25° C. over a period of 1 hour. The suspension was rotated for another two hours and subsequently centrifuged. The centrifugation residue was dried over concentrated sulfuric acid in a vacuum desiccator. The weight obtained was 2.20 g. Analysis of the catalyst obtained gave 8.1% of platinum (ICP-OES). TEM analysis (transmission electron microscope: Philips CM 30; the particles were applied to a carbon-coated copper gauze) of the catalyst particles indicated a fine coating of platinum particles which had a diameter of about 1–2 nanometer.

EXAMPLE 10

The procedure was as in Example 8. 2.00 g of Vulcan XC 72R were suspended in 20 ml of water and 5 ml of methanol. While continuing to rotate, 6.7 g of platinum sol prepared as described in Example 3 using a sulfonated PEEK protective colloid was pumped in at 20–25° C. over a period of 1 hour. The suspension was rotated for another 2 hours and subsequently centrifuged. The centrifugation residue was dried over concentrated sulfuric acid in a vacuum desiccator. The weight obtained was 2.30 g. Analysis of the catalyst obtained gave 13% of platinum (ICP-OES).

TEM analysis (transmission electron microscope: Philips CM 30; the particles were applied to a carbon-coated copper gauze) of the catalyst particles indicated a coating of very fine platinum particles whose diameter was not more than 1 nanometer.

EXAMPLE 11

An immobilization was carried out using a method analogous to Example 8. The support material used was 2.00 g of Vulcan XC 72R (manufacturer: Cabot B.V., Rozenburg, The Netherlands) which had been treated beforehand with a solution of sulfonated Hostatec®. 6.6 g (about 0.33 g of platinum, stabilizer: sulfonated Hostatec) of sol concentrate prepared as described in Example 1 were used. The weight obtained was 1.97 g.

EXAMPLE 12

An immobilization was carried out using a method analogous to Example 8. The support material used was 2.00 g of Vulcan XC 72R (manufacturer: Cabot B.V., Rozenburg, The Netherlands) which had been treated beforehand with a solution of polybenzimidazole. 6.6 g (about 0.33 g of platinum, stabilizer: sulfonated Victrex®) of sol concentrate prepared as described in Example 3 were used. The weight obtained was 2.06 g.

EXAMPLE 13

An immobilization was carried out using a method analogous to Example 8. The support material used was 2.00 g of Vulcan XC 72R (manufacturer: Cabot B. V., Rozenburg, The Netherlands) which had been treated beforehand with a solution of polybenzimidazole. 6.6 g (about 0.33 g of platinum, stabilizer: Nafion®) of sol concentrate prepared as described in Example 5 were used. The weight obtained was 1.68 g.

EXAMPLE 14

An immobilization was carried out using a method analogous to Example 8. The support material used was 2.00 g of Vulcan XC 72R (manufacturer: Cabot B. V., Rozenburg, The Netherlands) which had been treated beforehand with a solution of sulfonated Victrex®. 6.6 g (about 0.33 g of platinum, stabilizer: sulfonated Victrex®) of sol concentrate prepared as described in Example 3 were used. The weight obtained was 2.06 g. Analysis of the catalyst obtained gave 3.8% of platinum (ICP-OES).

What is claimed is:

1. A process for preparing metal colloid solutions by reacting a platinum compound and, if desired, one or more compounds of Rh, Ru, Ir or Pd with a reducing agent, wherein at least one cation-exchange polymer selected from the group consisting of: sulfonated polyaryl ether ketones, sulfonated polyether sulfones, sulfonated polyphenylene sulfides and sulfonated acrylonitrile-butadiene-styrene copolymers (ABS) poly($\alpha,\beta,\gamma$-trifluorostyrene-sulfonic acids) and poly(polyfluoroethylene-co-2-(1-methyl-2-vinyloxyethoxy)ethane sulfonic acid) is used for stabilizing the metal colloid solution.

2. The process as claimed in claim 1, wherein the cation-exchange polymer is added to the solution after the reduction step.

3. The process as claimed in claim 1, wherein the reduction is carried out in water, a mixture of water and at least one water-miscible organic solvent or in the absence of water in an organic solvent.

4. The process as claimed in claim 1, wherein the platinum compounds used are water-soluble compounds.

5. The process as claimed in claim 1, wherein the concentration of the Pt compound or the Pt and Rh, Ir, Ru and/or Pd compounds based on the solvent is in the range from 0.1 to 100 g/l of solvent.

6. The process as claimed in at claim 1, wherein the reducing agent used is sodium borohydride, hydrogen, hydroxymethanesulfinic acid sodium salt or a monohydric or dihydric alcohol.

7. The process as claimed in claim 1, wherein the preparation of the metal colloids is carried out at temperatures in the range from 0 to 200° C.

8. The process as claimed in claim 1, wherein the metal colloid solution stabilized with the cation-exchange polymer is purified or concentrated in a subsequent step.

9. The process as claimed in claim 1, wherein the cation-exchange polymer used has an ion-exchange capacity in, the range from 0.5 to 5 meq/g.

10. The process as claimed in claim 9, wherein the degree of sulfonation of the sulfonated cation-exchange polymers is in the range from 20 to 95%.

11. The process as claimed in claim 10, wherein the reducing agent used is hydroxymethanesulfinic acid sodium salt.

12. A water-soluble metal colloid comprising one or more platinum compounds and, if desired, one or more compounds of Rh, Ru, Ir or Pd, wherein the metal colloid is stabilized by a cation-exchange polymer, selected from the group consisting of: sulfonated polyaryl ether ketones, sulfonated polyether sulfones, sulfonated polyphenylene sulfides, sulfonated acrylonitrile-butadiene-styrene copolymers (ABS), poly($\alpha,\beta,\gamma$-trifluorostyrene-sulfonic acids), and poly(perfluoroethylene-co-2-(-1-methyl-2-vinyloxyethoxy) ethanesulfonic acid).

13. A water-soluble metal colloid as claimed in claim 12, wherein the cation-exchange polymer used has an ion-exchange capacity in the range from 0.5 to 5 meq/g.

14. A water-soluble metal colloid as claimed in claim 12, wherein the metal colloid has a solubility in water of at least 50 g/l, based on the metal concentration.

15. A water-soluble metal colloid as claimed in claim 12, wherein the metal colloid is on a support material.

16. A water-soluble metal colloid as claimed in claim 15, wherein the support material comprises carbon.

* * * * *